(12) United States Patent
Bashir et al.

(10) Patent No.: US 12,441,505 B2
(45) Date of Patent: Oct. 14, 2025

(54) CONTAINER ASSEMBLY, CLOSURE CAP FOR CONTAINER ASSEMBLY, CONTAINER FOR CONTAINER ASSEMBLY, METHOD FOR MANUFACTURING A CONTAINER ASSEMBLY

(71) Applicant: SABIC GLOBAL TECHNOLOGIES B.V., Bergen op Zoom (NL)

(72) Inventors: Zahir Bashir, Trivandrum (IN); Roshan Zameer, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/648,732

(22) Filed: Apr. 29, 2024

(65) Prior Publication Data
US 2024/0270434 A1 Aug. 15, 2024

Related U.S. Application Data

(63) Continuation of application No. 17/640,945, filed as application No. PCT/EP2020/075446 on Sep. 11, 2020, now Pat. No. 12,006,089.

(30) Foreign Application Priority Data

Sep. 12, 2019 (EP) ..................... 19196872

(51) Int. Cl.
*B65D 1/02* (2006.01)
*B29C 71/00* (2006.01)
(Continued)

(52) U.S. Cl.
CPC ........ *B65D 1/0207* (2013.01); *B29C 71/0063* (2013.01); *B65D 1/0246* (2013.01);
(Continued)

(58) Field of Classification Search
CPC ............... B65D 1/0246; B65D 1/0207; B65D 41/3428; B29C 71/0063; B29K 2067/003; B29K 2995/0041; B29K 2031/7158
See application file for complete search history.

(56) References Cited

U.S. PATENT DOCUMENTS

| 4,928,835 A | 5/1990 | Collette et al. |
| 5,673,808 A | 10/1997 | Valyi et al. |

(Continued)

FOREIGN PATENT DOCUMENTS

| EP | 0154502 A2 | 9/1985 |
| EP | 0439842 B1 | 7/1994 |

(Continued)

OTHER PUBLICATIONS

International Search Report & Written Opinion; International Application No. PCT/EP2020/075446; International Filing Date: Sep. 11, 2020; Date of Mailing: Nov. 26, 2020; 65 pages.

*Primary Examiner* — Andrew T Kirsch
(74) *Attorney, Agent, or Firm* — CANTOR COLBURN LLP

(57) ABSTRACT

Container assembly comprising a container and a closure, wherein the container is made of a crystallisable polymer material and comprises a neck portion with an outer cap surface and defines an outlet opening, the neck portion being configured for receiving the closure, wherein the closure includes a closure cap made of a crystallisable polymer material and has an inner cap surface, the closure cap being matched to the neck portion of the container to cover the outlet opening in a closed state, wherein the inner cap surface of the closure cap contacts the outer cap surface of the neck portion when the container assembly is closed, and wherein the material of the inner cap surface of the closure cap and/or of the outer cap surface of the neck portion is (Continued)

crystallised, to allow the container assembly to be opened after being closed for an elongated period of time.

12 Claims, 1 Drawing Sheet

(51) Int. Cl.
  *B65D 41/34* (2006.01)
  *B29K 67/00* (2006.01)
  *B29L 31/00* (2006.01)
(52) U.S. Cl.
  CPC .... *B65D 41/3428* (2013.01); *B29K 2067/003* (2013.01); *B29K 2995/0041* (2013.01); *B29L 2031/7158* (2013.01)

(56) References Cited

U.S. PATENT DOCUMENTS

| 7,033,656 | B2* | 4/2006 | Nahill | B29C 49/6436 |
|---|---|---|---|---|
| | | | | 428/542.8 |
| 2009/0223920 | A1 | 9/2009 | Patel et al. | |
| 2022/0340324 | A1 | 10/2022 | Bashir et al. | |

FOREIGN PATENT DOCUMENTS

| EP | 1027203 | A1 | 8/2000 |
|---|---|---|---|
| EP | 2028110 | A1 | 2/2009 |
| GB | 2429971 | A | 3/2007 |
| JP | H02209219 | A | 8/1990 |
| WO | 0183193 | A1 | 11/2001 |
| WO | 2013076934 | A1 | 5/2013 |

* cited by examiner

CONTAINER ASSEMBLY, CLOSURE CAP FOR CONTAINER ASSEMBLY, CONTAINER FOR CONTAINER ASSEMBLY, METHOD FOR MANUFACTURING A CONTAINER ASSEMBLY

CROSS REFERENCE TO RELATED APPLICATIONS

This application is a continuation application of application Ser. No. 17/640,945, filed Mar. 7, 2022, which is a National Stage application of PCT/EP2020/075446, filed Sep. 11, 2020, which claims the benefit of European Application No. 19196872.6, filed Sep. 12, 2019, all of which are incorporated by reference in their entirety herein.

BACKGROUND OF THE INVENTION

Field of the Invention

The present invention relates to a container assembly comprising a container and a closure, wherein the container is suited for holding e.g. liquids, carbonated liquids, granular material or other substances, the container being made of a crystallisable polymer material and comprising a neck portion that has an outer neck surface and defines an outlet opening of the container, the neck portion being configured for receiving the closure in a closed state of the container assembly, wherein the closure includes a closure cap that is made of a crystallisable polymer material and has an inner cap surface, the closure cap being matched to the neck portion of the container to cover the outlet opening when the container assembly is in the closed state, and wherein the inner cap surface of the closure cap is in contact with the outer neck surface of the neck portion when the container assembly is in the closed state.

The invention further relates to a closure cap made of a crystallisable polymer material and having an inner cap surface the closure cap being matchable to a neck portion of a container to cover an outlet opening of said neck portion when the container is closed by the closure cap to form a container assembly.

The invention further relates to a container suited for holding e.g. liquids, carbonated liquids, granular material or other substances, the container being made of a crystallisable polymer material and comprising a neck portion that has an outer neck surface and defines an outlet opening, the neck portion being configured for receiving a closure to form a container assembly.

The invention further relates to a method for manufacturing a container assembly.

Description of the Related Art

Commercially available containers, e.g. bottles or other containers, are nowadays often made of polyethylene terephthalate (PET) material. Their closures however, are not made of PET. They are often made of other materials, such as polyethylene (PE) or polyolefin (PO).

This use of different materials in one container assembly has several disadvantages. First of all, the use of at least two different materials makes it difficult to properly recycle the container assembly. As the closure and the container are made of different materials, they must be separated from each other before optimal recycling is possible. A closure of a container assembly often comprises a closure cap and a tamper ring, e.g. a threaded closure cap and a tamper ring. The tamper ring is attached to both the closure cap and the container before the container assembly is opened for the first time, and remains attached to the container thereafter (but is then separated from the closure cap). While it is relatively easy to separate the closure cap from the container (but it is still an undesirable recycling step), especially separating the tamper ring from the container before recycling the container assembly is difficult.

Secondly, the container assembly may contain a gas, e.g. when the container holds a carbonated drink. However, the gas retention properties of PET are better than those of PE and PO, such that the use of PE or PO as material for the closure increases the decay of the freshness of the contents of the container assembly.

European patent publication EP 0 439 842 A1, dating back to 1990, already relates to a plastic closure for use with a container, wherein both the plastic closure and the container may be made of polyethylene terephthalate (PET). However, until the present day such a container assembly has not been introduced with commercial success.

OBJECT OF THE INVENTION

An object of the invention is therefore to provide an improved container assembly. More specifically, it is an object of the invention to provide an improved container assembly wherein the closure and the container are both made of substantially the same material.

BRIEF SUMMARY OF THE INVENTION

Most commonly the neck, e.g. the threaded neck, of a PET container, e.g. bottle, is in an amorphous state. The PET bottle is made from an amorphous preform and while the body of the preform is stretched and crystallised the neck part, which is usually thicker, is less stretched and can remain amorphous. Also the cap of the container, which is usually injection moulded, is often amorphous. The applicant has found that, when the closure caps as well as the container of the container assembly, more specifically the neck of the container, are made of a polymer material in an amorphous state, "blocking" of the cap may occur after an elongated period of time of being capped.

There are polymer materials which are essentially permanently amorphous, as a result of structural irregularity. However, there are polymers that are crystallisable but which can end up as amorphous in parts during injection moulding, due to the crystallisation rate being slow compared with the cooling rate from the melt. Crystallisable polymers that crystallise very fast have crystallisation half times of seconds—for example polyethylene. Such polymers typically give articles in the semi-crystalline state. At the other end of the spectrum are crystallisable polymers which have crystallisation half times of the order of days—an example is the polycarbonate of bisphenol A. Such polymers are for practical purposes typically amorphous, despite being crystallisable in principle. In between are crystallisable polymers with crystallisation half-times of tens of seconds to several minutes, and these can be obtained in amorphous or crystalline states depending on the cooling rate. Examples of such polymers are polyesters such as poly(ethylene terephthalate) (PET), poly(ethylene naphthalate) (PEN) and poly(ethylene furanoate) (PEF). Taking PET, the most common polyester, normal injection moulding conditions would lead to bottles with necks in the amorphous state and caps in the amorphous state, and this would lead to blocking of the cap on the neck. However, by altering the cooling conditions in the mould or by post heating of the amorphous parts (neck or cap), the part can be made at least partially semi-crystalline. This invention is not restricted to PET bottles and caps but includes other crystallisable polymers such as PEN and PEF which have similar crystallisation half times as PET.

Blocking refers to the cap becoming unopenable after a period of time. Blocking in this case is a form of cold welding. It is a phenomenon that occurs in amorphous materials, namely that there is slow interdiffusion of polymer chains across the cap and the container, e.g. the neck. This effect is readily noticeable (and generally known to occur) at temperatures above the glass transition temperature (Tg), but also below Tg this effect is noticeable after elongated periods of time, e.g. after a period of longer than a week, such as after several weeks and/or months.

More specifically, when a closure cap and a container (neck) are both made of a crystallisable polymer in an amorphous state, e.g. PET, and are fastened to each other (and are thereby in contact with each other), the polymer chains in the amorphous state of both the closure cap and the container slowly diffuse, increasing the friction coefficient between the container and the closure cap. After an elongated period of time of being closed, this diffusion/blocking makes it more difficult or even impossible to open the container assembly again. This is especially disadvantageous for e.g. container assemblies containing consumer goods, when the container assemblies are stored relatively for relatively long periods of time, for example on shelves of a store before being sold to a consumer, or when the consumer stores the container assembly relatively long at home before opening the container assembly. A long period of time may be 6 to 9 months, or even years. The state of New Jersey, for example, has regulated that water bottles can stay on shelves for two years. In such long-storage scenarios, it may then be difficult to get the goods contained in the container assembly out of it, as it is difficult or impossible to open the container assembly. To produce a container assembly which cannot be opened after being closed for an elongated period of time is of course undesirable.

Accordingly, the invention relates to a container assembly comprising a container and a closure, wherein:

the container is suited for holding e.g. liquids, carbonated liquids, granular material or other substances, the container being made at least partially of a crystallisable polymer material and comprising a neck portion that has an outer neck surface and defines an outlet opening of the container, the neck portion being configured for receiving the closure in a closed state of the container assembly;

the closure includes a closure cap that is made of a crystallisable polymer material and has an inner cap surface, the closure cap being matched to the neck portion of the container to cover the outlet opening when the container assembly is in the closed state; and the inner cap surface of the closure cap is in contact with the outer neck surface of the neck portion when the container assembly is in the closed state;

characterised in that the crystallisable polymer material of the inner cap surface of the closure cap and/or of the outer neck surface of the neck portion is crystallised, to allow the container assembly to be opened after being closed for an elongated period of time.

Advantageously, by crystallising the inner cap surface of the closure cap and/or the outer neck surface of the neck portion of the container, the effect of "blocking" is prevented, or at least postponed. That is, diffusion of chains across the interface between the closure and the neck is greatly reduced, such that also the friction coefficient between the two surfaces is not increased over time. Or at least this effect is less noticeable than compared to contacting surfaces that are of the same crystallisable polymer material and are both uncrystallised. This follows from the fact that polymer chains in the crystallisable polymers are locked into crystalline lamellae and hence cannot diffuse (compared to the amorphous state in which diffusion is possible).

Hence, the invention provides a container assembly wherein both the closure and the container may be made of the same crystallisable polymer material, e.g. PET, while opening of the container assembly is still possible after it has been closed for a prolonged period of time. It is believed that these characteristics make commercial introduction of such container assemblies possible.

For example, the inner cap surface of the closure cap and/or the outer neck surface of the neck portion of the container may be crystallized after the part is made via known methods by heating said surface relatively quickly, such as for 15-100 s, to a temperature of between 140° C. and 250° C., e.g. 45-60 s at 170° C. (when the polymer material is PET, for other materials other temperatures may apply) and wait until the material becomes opaque (e.g. turns white). This transformation into the crystallised state may occur faster or slower depending on the used temperature for cold crystallisation. This transformation need not necessarily affect the entire thickness of the material. The crystallization need only present at the surface of the material being crystallized. Crystallization need only extend to a depth sufficient to impede, restrict or even prevent interdiffusion that contributes to blocking. Thus, a temporary flame-treatment, or temporary exposure to radiation, and/or even a hot air blast, may be sufficient to cause crystallization among the polymers defining one or both of the inner cap surface and the outer neck surface. As a result, while the formed part may comprise a monolithic polymer, the part is not monolithic in that the crystallinity can vary across thickness, with one surface being defined by essentially amorphous materials, and an opposite surface being defined by and essentially crystalline material, and the material extending between the representing a graded transition between the two states, more simply referred to as a semi-crystalline state, although it bears mentioning that at any instant depth beneath the surface the degree of crystallinity may be different. Thus, in various examples the mating surface has a higher level of crystallinity than the non-mating surface.

As illustrated in the comparative examples below, it is also important to note that a desired decrease in blocking may be achieved by only treating one of two mating surfaces. Thus, one may treat an outer neck surface and leave the cap in an essentially amorphous state. Likewise, one may treat the inner cap surface and leave the outer neck surface in an essentially amorphous state.

Alternatively, a part may be crystallized by cooling it slowly after the material is melted, such as for 10 s, e.g. by using an oil heated mould at 170° C. Again, the transformation into the crystallised state is recognizable by the fact that the material becomes opaque (e.g. turns white), and may take a variable amount of time depending on the starting temperature of the melt and the cooling applied. As set forth above, in various examples a part may be cooled such that it is not crystallized entirely, but only proximal the mating surface (i.e. the inner cap surface). As with the neck, the cap may comprise a thickness across which the crystallinity varies at any given depth. Thus, the mating surface may be more crystalline than a portion below the mating surface, at least to the depth necessary for the crystallinity of the material to impede interdiffusion. Extending further across the thickness, crystallinity can decrease, such that the non-mating surface has less crystallinity than the mating surface, and in some cases is essentially amorphous. In the case of cooling to promote crystallinity, a variety of techniques can be used, such as radiative cooling (e.g., exposing only the mating surface to a lower temperature heat source), convection cooling in gas or liquid (e.g., quenching); or even temporarily coupling the mating surface to a cooled mandrel to transfer heat via conduction. Any one of these modes can give rise to anisotropic crystallinity across the depth of the part (cap and/or neck).

PET crystallises from the amorphous state by re-heating between 80-250° C. It also crystallises from the melt by cooling between 250-100° C. The fastest crystallisation rate is at ~170° C. for PET, when cooled from the melt and about 150° C. when cold crystallised from the amorphous state. One can mould the neck or cap into an amorphous state and post-crystallise (cold crystallise) it at 140-170° ° C., such as for 15-60 s. It is noted that crystallisation of polymer materials is a known method, which is known to the person skilled in the art.

It is noted that the "closed" state of the container assembly refers to the state in which the closure cap is arranged on the container, such that the outlet opening of the container is closed. The "open" state of the container in contrast refers to the state in which the outlet opening is open, and contents of the container may leave the container through the outlet opening. In the open state, the closure cap may be removed from the container.

It is noted that a "crystallised" state of a crystallisable polymer is relative to the "uncrystallised" or "amorphous" state. Compared with the amorphous state, in the crystallised state a polymer has a more ordered structure. Crystallisable polymers may be either "crystallised" or "uncrystallised", but most often have an intermediate degree of crystallisation. PET in particular can be obtained in the uncrystallised (amorphous) state by cooling fast from the melt, or in state of intermediate crystallisation by cooling slowly from the melt. Amorphous PET may be crystallised by heating above the Tg (78° C.) for example to 170° C.—this is referred to as cold crystallisation. Another visual difference is that amorphous PET is transparent. The PET that is thermally crystallized from the melt or by cold crystallisation is opaque (white). In the context of the present invention, a polymer may be in the "crystallised" state when it is treated to obtain a higher degree of crystallisation compared with the normal production process when the polymers are untreated. In the context of the present invention, a polymer may be in the "crystallised" state when the described effect of blocking is prevented or reduced for an elongated period of time.

It is noted that an "elongated period of time" refers to a period of a least a week, e.g. several weeks.

The crystallisable polymer may be a thermoplastic polymer, such as a thermoplastic polyester. In an embodiment, the material of the container comprises at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate and polyethylene naphthalate, polybutylene terephthalate or blends of polyethylene terephthalate with polybutylene terephthalate. The material of the container may e.g. comprises mixtures of these materials, or one or more materials of this list with trace amounts of other materials added thereto. Each material of this list is a readily available, often used material for containers, such that a container made of such a material may be cheaply produced. The most preferred is polyethylene terephthalate and its copolymers.

In an embodiment, the material of the container comprises at least 80 Wt % polyethylene terephthalate (PET) material, such as at least 95 Wt % of PET material, preferably at least 99 Wt % of PET material. It should be noted that below 15 Wt % comonomer, the PET copolymer becomes non-crystallisable due to the structural irregularity, so no more than 15 Wt % comonomer should be present. The material of the container may e.g. be substantially made of PET material, with trace amounts of other material mixed therewith. Especially PET is a cheap, commonly-used and readily available material for containers, such that advantageously no major changes in presently-used production methods are needed to benefit from the improvements brought by the disclosed container assembly.

In an embodiment, the material of the closure cap or the closure comprises at least one of the polymers from the list of polyethylene terephthalate homopolymers, polyethylene terephthalate copolymers, such as those comprising 0.5% to 5% comonomers such as isophthalic acid or cyclo hexane dimethanol, polyethylene terephthalate with PMDA, polyethylene naphthalate copolymers, polyethylene naphthalate homopolymers, blends of polyethylene terephthalate and polyethylene naphthalate, polybutylene terephthalate or blends of polyethylene terephthalate with polybutylene terephthalate. The material of the closure cap or the closure may e.g. comprises mixtures of these materials, or one or more materials of this list with trace amounts of other materials added thereto. Each material of this list is a readily available, often used material, such that a closure made of such a material may be cheaply produced In an embodiment, the material of the closure or the closure cap comprises at least 80 Wt % polyethylene terephthalate (PET) material, such as at least 95 Wt % of PET material, preferably at least 99 Wt % of PET material. The material of the closure or the closure cap may e.g. be substantially made of PET material, with possibly trace amounts of other material mixed therewith. Especially PET is a cheap, readily available and commonly-used material for containers. If also the closure cap is then made of PET, this significantly improves the gas retention properties of the resulting container assembly, on top of improving the recycling possibilities (as previously described).

In a preferred embodiment the closure, or at least the closure cap of the closure, is made of the same material as the container. In embodiments, the materials of the container and the closure are substantially the same, wherein e.g. only trace amounts, of e.g. less than 5 Wt %, of components added to the material are different. Recycling can be performed in an efficient manner when the material of the closure cap or the closure and the container is the same. Even when some components of the container assembly are made of an amorphous polymer material and some other components of the container are made of the same polymer material, but in a crystallised state, in the context of the present invention the container assembly may be made of the "same" material.

In an embodiment, the container, e.g. the container neck, of the container assembly is made in an amorphous state, and the inner cap surface of the closure cap is made in a crystallised state, wherein the material of the container and the cap is preferably the same. Advantageously, only the inner cap surface of the closure cap then needs to be crystallized to prevent the effect of blocking, while the container can be manufactured via a known manufacturing method.

In an alternative embodiment, the closure cap of the container assembly is made of in an amorphous state, and the outer neck surface of the neck portion of the container is made in a crystallised state, wherein the material of the container ant the cap is preferably the same.

In a further alternative embodiment, both the outer neck surface of the neck portion of the container and the inner cap surface of the closure cap are made of a crystallised polymer material. This optimally delays the effect of blocking.

In an embodiment, the degree of crystallinity of the inner cap surface of the closure cap and/or of the outer neck surface of the neck portion is at least 10%. As explained, the material of the closure cap and/or of the neck portion may be crystallized even when the degree of crystallisation is below 100%. In embodiments, the degree of crystallisation of the inner cap surface of the closure cap and/or of the outer neck surface of the neck portion is between 30% and 80%, such as between 30% and 50%, preferably between 30% and 40%.

In an embodiment, the outer neck surface of the neck portion is threaded and the inner cap surface of the closure cap is threaded, such that the container assembly, in use, can be opened and closed by a rotational motion of the closure cap with respect to the container. A rotatable closing cap is e.g. often found on container assemblies for drinks. A rotatable closing cap allows for easy opening and secure closing of container assemblies.

In an embodiment the closure further comprises a tamper ring that is connected to the closure cap when the container assembly has never been opened and that is disconnected from the closure cap when the container assembly is opened at least once. A tamper ring is often found on container assemblies and may assure a user of the container assembly that the content thereof equal the content placed therein by the company that originally filled the container assembly.

In an embodiment the container assembly is a bottle for drinks, e.g. carbonated drinks or non-carbonated drinks, or other liquids such as cleaning liquids et cetera.

The invention further relates to a closure cap, made of a crystallisable polymer material and having an inner cap surface, the closure cap being matchable to a neck portion of a container to cover an outlet opening of said neck portion when the container is closed by the closure cap to form a container assembly, wherein the crystallisable polymer material of the inner cap surface of the closure cap is crystallised, to allow the container assembly to be opened after being closed for an elongated period of time.

Embodiments described in the above in relation to the container assembly may, where applicable, also apply to the closure cap.

The invention further relates to a container suited for holding e.g. liquids, carbonated liquids, granular material or other substances, the container being made of a crystallisable polymer material and comprising a neck portion that has an outer neck surface and defines an outlet opening, the neck portion being configured for receiving a closure to form a container assembly, wherein the outer neck surface of the neck portion is crystallised, to allow the container assembly to be opened after being closed for an elongated period of time.

Embodiments described in the above in relation to the container assembly may, where applicable, also apply to the container.

In all embodiments, the PET preferably has an intrinsic viscosity or I.V.>0.55 dL/g. The PET may be virgin or recycled, or a mixture of both.

Another aspect of the invention relates to a method for manufacturing a container assembly, such as an aforementioned container assembly, the method comprising the steps of:
providing a container having a neck portion and/or
providing a closure cap, matched to the neck portion of the container, wherein the neck portion and/or the closure cap are made of a crystallisable polymer material; characterised by
crystallising the crystallisable polymer material of the inner cap surface of the closure cap and/or of the outer neck surface of the neck portion is, to allow the container assembly to be opened after being closed for an elongated period of time.

According to a first embodiment, the method comprises the step of providing a container having a neck portion made of crystallisable polymer material, e.g. in an amorphous state, the container being manufactured via a method known per se and a step of injection moulding a cap of crystallisable polymer material, wherein during the injection moulding step of the cap, the material of the cap is allowed to cool slowly such that the material of the cap is crystallised.

According to a second embodiment, the method comprises the step of providing a container having a neck portion made of crystallisable polymer material, e.g. in an amorphous state, the container being manufactured via a method known per se and a step of injection moulding a cap of crystallisable polymer material, wherein after the injection moulding step of the cap, the material of the cap, at least the inner cap surface thereof, is heated quickly to a temperature above the glass transition temperature but below the melt temperature and kept at said temperature until the material is crystallized. Suitable temperature ranges are identified in the above.

According to a third embodiment, the method comprises the step of providing a container cap made of a crystallisable polymer material, e.g. PET, e.g. in the amorphous state, e.g. made via an injection moulding process. The method furthermore comprises the step of providing a container having a neck portion, e.g. made via an injection moulding process, wherein the neck of the container is cooled slowly after injection moulding said container, such that the material of the neck is crystallised.

According to a fourth embodiment, the method comprises the step of providing a container cap made of a crystallisable polymer material, e.g. PET, e.g. in the amorphous state, e.g. made via an injection moulding process. The method furthermore comprises the step of providing a container having a neck portion, e.g. made via an injection moulding process, wherein the neck of the container is post-treated after injection moulding said container, wherein the post-treatment comprises heating the neck portion of the container quickly to a temperature above the glass transition temperature but below the melt temperature and keep it at said temperature until the material of the neck portion is crystallised. Suitable temperature ranges are identified in the above.

Especially for the second aspect of the invention, it must be noted that steps of different embodiments may be combined. As a non-limiting example, the step of slowly cooling the cap according to the first embodiment may be combined with the step of slowly cooling the neck of the container according to the third embodiment, such that both the neck of the container and the cap of the container are crystallised.

BRIEF DESCRIPTION OF THE DRAWINGS

The present invention will be explained hereafter with reference to exemplary embodiments of the container assembly according to the invention and with reference to the drawing. Therein.

DETAILED DESCRIPTION

Figure 1:
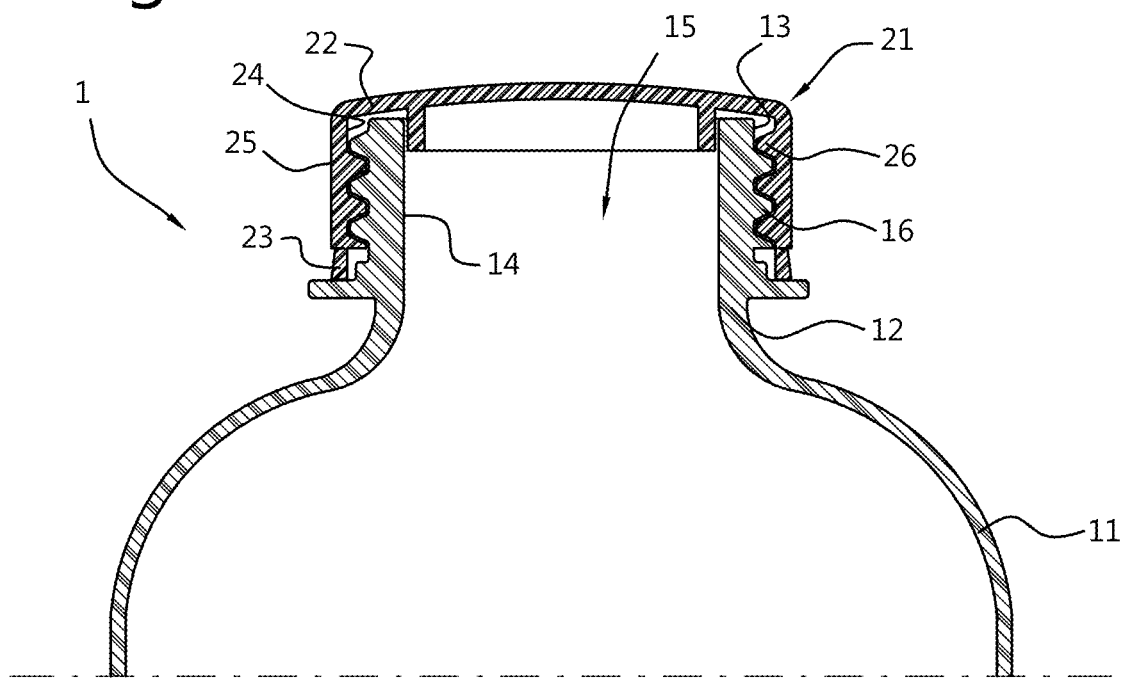
FIG. 1 schematically shows a cross-sectional view of a container assembly including a container and a closure in a closed state thereof.
Figure 2:
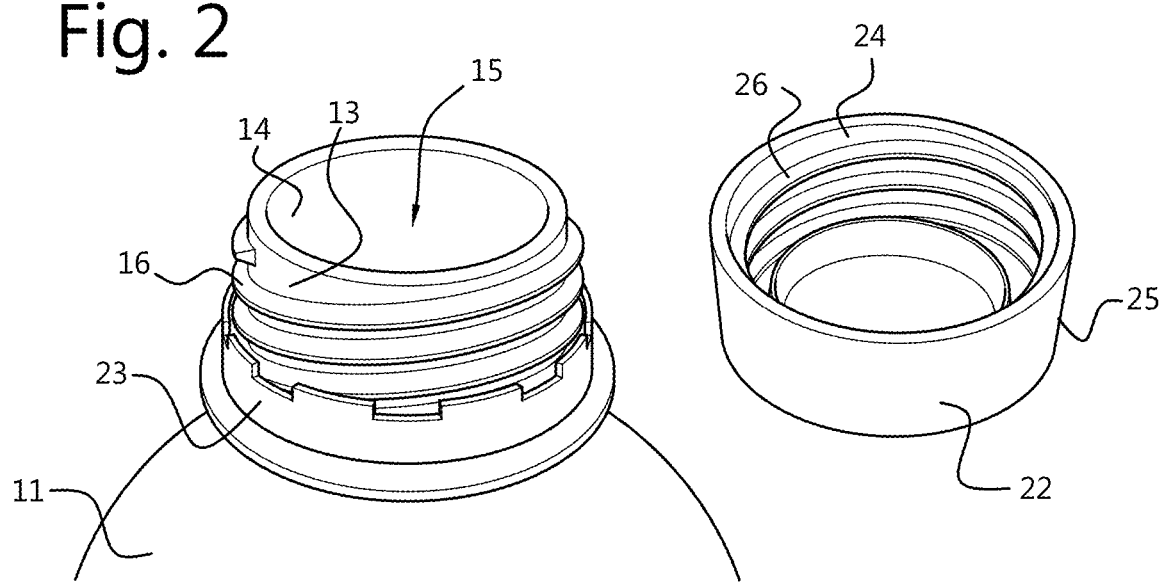
FIG. 2 schematically shows an isometric view of a container assembly including a container and a closure in an open state thereof.

Shown with reference to FIGS. 1 and 2 is a container assembly 1. The container assembly 1 comprises a container 11 and a closure 21. FIG. 1 shows a closed state of the container assembly 1, with closure cap 22 applied to the container 11, whereas FIG. 2 shows an open state of the container assembly 1, with closure cap 22 removed from the container 11.

The container 11 is suited for holding, storing or containing goods, e.g. consumer goods, e.g. in the form of a liquid such as a drink, e.g. a carbonated drink, or e.g. granular material or other substances or goods. For example, the container may be a bottle.

The container 11 is made of a crystallisable polymer material, e.g. at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate, polyethylene naphthalate, and polybutylene terephthalate or blends of polyethylene terephthalate with polybutylene terephthalate or mixtures thereof. Preferably, the container 11 is made of PET material, e.g. comprising at least 50 Wt % of PET material, such as at least 80 Wt % or more. Preferably the container 11 is made of one material or of one material mixture, such that the chemical composition of the container 11 is uniform. Preferably, the material of the container 11 is the same as the material of the closure cap 22.

The container 11 comprises a neck portion 12, e.g. defined by an upstanding vertical wall portion, that has an outer neck surface 13 and an inner neck surface 14 and defines an outlet opening 15. The inner neck surface 14 of the neck portion 12 may be the surface that is in contact with contents of the container 11 when said content is e.g. poured out of the container. The outer neck surface 13 may be the surface that can be grabbed by a user of the container 11 when placing a hand of the user around the container 11. The outer neck surface 13 is especially well visible in the isometric view of FIG. 2. As visible in the figures, the outer neck surface 13 of the neck portion 12 may e.g. comprise screw thread 16, to allow a closure 21 to be screwed on the container 11. The outlet opening 15 of the container 11 is the opening through which contents thereof leave the container 11 (in normal use). The outlet opening 15 may also function as an inlet opening.

The neck portion 12, and especially the outer neck surface 13 thereof, is configured for receiving the closure 21 of the container assembly 1. When the closure 21 is placed on the container 11, the container assembly 1 may be in a closed state. When the container assembly 1 is in the closed state, the closure 21 is placed on the container 11.

The closure 21 of the container assembly 1 includes at least a closure cap 22, made of a crystallisable polymer material, e.g. at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate, polyethylene naphthalate and polybutylene terephthalate or blends of polyethylene terephthalate with polybutylene terephthalate, or mixtures thereof. Preferably, the closure cap 22 is made of PET material, e.g. comprising at least 50 Wt % of PET material, such as at least 80 Wt % or more. Preferably the closure 21 is made of one material or of one material mixture, such that the chemical composition of the closure 21 is uniform. Preferably the material of the closure cap 22 is the same as the material of the container 11.

The closure cap 22 of the closure 21 has an inner cap surface 24 and an outer cap surface 25. The outer cap surface 25 of the closure cap 22 may be the surface that a user of the container assembly 1 grips to open the closure 21. The inner cap surface 24 of the closure cap 22 is the surface that, in an closed state of the container assembly 1, contacts the outer neck surface 13 of the neck portion 12 of the container 11. The inner cap surface 24 is especially visible in FIG. 2. As can be seen in the figures, the inner cap surface 24 of the closure cap 22 may be threaded, to allow the closure cap 22 to be screwed on the container 11. The threads 16, 26 on the outer neck surface 13 of the neck portion 12 of the container 11 respectively on the inner cap surface 24 of the closure cap 22 are preferably matched to each other to allow the closure cap 22 to be screwed on the container 11.

The closure cap 22 is matched to the neck portion 12 of the container 11, to allow the closure cap 22 to cover the outlet opening 15 of the container 11 when the closure cap 22 is placed on the container 11. That is, when the container assembly 1 is in the closed state, the closure cap 22 closes the outlet opening 15.

The closure 21 may further comprise a tamper ring 23. As can be seen in FIG. 1, the tamper ring 23 is connected to the closure cap 22 and the container 21 when the container assembly has never been opened. As can be seen in FIG. 2, the tamper ring 23 is disconnected from the closure cap 22 when the container assembly 1 is opened at least once, while remaining connected to the container 11.

At least one of the material of the inner cap surface 24 of the closure cap 22 and the material of the outer neck surface 13 of the neck portion 12 is crystallised. That is, the material of the inner cap surface 24 of the closure cap 22 is crystallised, or the material of the outer neck surface 13 of the neck portion 12 is crystallised, or the material of the outer neck surface 13 of the neck portion 12 and the material of the inner cap surface 24 of the closure cap 22 are both crystallised. In other words, at least one of the two contacting surfaces 13, 24 is crystallised. This crystallisation of at least one of the contacting surfaces 13, 24 allows the container assembly to be opened after being closed for an elongated period of time. In other words, this crystallisation of at least one of the contacting surfaces 13, 24 prevents or at least reduces the effect of blocking.

The invention furthermore relates to individual components of the disclosed container assembly 1. That is, the invention further relates to closure cap 22, made of a crystallisable polymer material and having an inner cap surface 24, the closure cap 22 being matchable to a neck portion 12 of a container 11 to cover an outlet opening 15 of said neck portion 12 when the container 11 is closed by the closure cap 12 to form a container assembly 1, wherein the crystallisable polymer material of the inner cap surface 24 of the closure cap 22 is crystallised, to allow the container assembly to be opened after being closed for an elongated period of time, and a container 11 suited for holding e.g. liquids, carbonated liquids, granular material or other substances, the container 11 being made of a crystallisable polymer material and comprising a neck portion 12 that has an outer neck surface 13 and defines an outlet opening 15, the neck portion 12 being configured for receiving a closure 21 to form a container assembly 1, wherein the outer neck surface 13 of the neck portion 12 is crystallised, to allow the container assembly to be opened after being closed for an elongated period of time.

The degree of crystallinity of the crystallised surface 13, 24 may be between 10% and 80%, e.g. between 30% and 80%, such as between 30% and 40%.

COMPARATIVE EXAMPLES (CE) AND EXAMPLES

In the example below Coefficient of Friction ("CoF") tests have been carried out to show proof of concept using analytical methods. A measurement of the normal force needed to separating two contacted sheets was also made.

In these tests, there is a base amorphous PET sheet. On top of this amorphous PET sheet, a crystallised PET sheet (the sliding PET sheet) was placed, and the frictional load on sliding the top sheet relative to the bottom, was measured. The crystallised PET was prepared from the amorphous PET sheet by cold crystallisation above the Tg. In the example PET sheet samples with different cold crystallisation temperatures have been studied.

The sliding PET sheet samples were prepared by annealing the amorphous sheet at different temperatures—80° C., 110° C., 140° C. and 170° C. (Tc in Table 1). The last three sheets turned translucent or opaque indicating they had crystallised, while the 80° C. treatment left the sheet transparent indicating it had not crystallised.

The base sheet sample used was a PET sheet without any crystallisation preparation. To accelerate the diffusion process, both the base and sliding sheet samples were sandwiched with a 200 g weight on top and kept in the oven at 80° C. for 3 hours. 80° C. was selected as it was just above the glass transition of PET (78° C.), so that it would speed up diffusion across the interface of the two films, but the temperature was too low to cause cold crystallisation even after 3 h. For the CE, the top sheet and bottom sheet were exposed to 80° C. for 3 h, but they did not crystallise as evidenced by the fact that they remained transparent; the amorphous-amorphous sandwich was then removed and the sliding friction at room temperature was determined. The amorphous-crystalline sandwich sheets of Examples 1-3, were likewise kept with the weight at 80° C. for 3 hours to aid diffusion across the interface between the amorphous base sheet and the crystallised top sheet. After this the sandwiches were removed and the sliding friction at room temperature was determined. Below are the CoF results:

TABLE 1

| Example | Sliding sheet Tc (° C.) | Static CoF | Kinetic CoF | Load (N) |
|---|---|---|---|---|
| Comparative Example | 80 | 4.21 | 0.22 | 8.9 |
| Example 1 | 110 | 0.28 | 0.17 | 0.3-0.4 |
| Example 2 | 140 | 0.19 | 0.17 | 0.3-0.4 |
| Example 3 | 170 | 0.15 | 0.14 | 0.3-0.4 |

It can be noticed that the static CoF and load needed to separate the sheets is relatively high with the Comparative Example, as both top and bottom sheets were in the amorphous state and diffusion across the interface was substantial after 3 hours at 80° C. The high CoF of the amorphous-amorphous sandwich correlates with blocking. Whereas with Examples 1-3 where the top sheets were crystallized at higher temperatures, the CoF values reduced significantly. Likewise, the normal force needed to separate the sheets by pulling shows the same trend. The amorphous-amorphous sheet sandwich of the Comparative Example requires a large force, more than 10× than is needed for the amorphous-crystalline pairs of Examples 1-3. This is because cold welding through diffusion occurs in the amorphous-amorphous pair, but not in the amorphous-crystalline pairs. These results prove the concept of the invention, which is about creating an amorphous-crystalline interface between two PET parts to reduce blocking.

In practice, it may take weeks for blocking to happen as the application shall be below the Tg in service conditions. Thus the optimum solution range in terms of crystallisation temperature and moulding process conditions can be arrived at based on actual moulded samples. The mould therein is preferably designed in such a way that only the surfaces to be crystallized are exposed to the stated crystallisation temperatures, e.g. 170° C.

LIST OF REFERENCE NUMERALS

1—container assembly
11—container
12—neck portion
13—outer cap surface of neck portion
14—inner neck surface of neck portion
15—outlet opening
16—screw thread
21—closure
22—closure cap
23—tamper ring
24—inner cap surface of cap
25—outer cap surface of cap
26—screw thread

The invention claimed is:

1. A container assembly comprising a container and a closure, wherein:
the container is made of a crystallisable polymer material and comprises a neck portion that has an inner neck surface and outer neck surface and defines an outlet opening of the container, the neck portion being configured for receiving the closure in a closed state of the container assembly;
the closure includes a closure cap and a tamper ring connected to the closure cap when the container assembly has never been opened,
the closure cap is made of a crystallisable polymer material and has an inner cap surface with which the outer neck surface of the neck portion is in contact when the container assembly is in a closed state, the closure cap being matched to the neck portion of the container to cover the outlet opening when the container assembly is in the closed state;
the crystallizable polymer material of the inner cap surface of the closure cap with which the outer neck surface of the neck portion is in contact when the container assembly is in a closed state is crystallized more than an outer cap surface; and a degree of crystallinity of the inner cap surface of the closure cap is between 10% and 80%.

2. The container assembly according to claim 1, wherein the degree of crystallinity of the inner cap surface of the closure cap is between 30% and 80%.

3. The container assembly according to claim 1, wherein the degree of crystallinity of the inner cap surface of the closure cap is between 30% and 50%.

4. The container assembly according to claim 1, wherein the degree of crystallinity of the inner cap surface of the closure cap is between 30% and 40%.

5. The container assembly according to claim 1, wherein the material of the container and/or the closure cap comprises at least 80 Wt % polyethylene terephthalate material.

6. A method for manufacturing a container assembly according to claim 1, the method comprising:
providing the closure cap; and
crystallising the crystallisable polymer material of the inner cap surface of the closure cap.

7. The method according to claim 6, wherein crystallising the crystallisable polymer material of the inner cap surface of the closure cap comprises heating the inner cap surface of the closure cap for 15 to 100 seconds to a temperature of between 140° C. and 250° C.

8. The method according to claim 7, wherein the material of the closure cap comprises at least 80 Wt % polyethylene terephthalate material.

9. A method for manufacturing the container assembly according to claim 1,
the method comprising heating the inner cap surface of the closure cap for 15 to 100 seconds to a temperature of between 140° C. and 250° C.

10. The method according to claim 9, wherein the material of the closure cap comprises at least 80 Wt % polyethylene terephthalate material.

11. The method according to claim 9, wherein:
the outer neck surface of the neck portion with which the inner cap surface of the closure cap is in contact when the container assembly is in the closed state is crystallized more than the inner neck surface; and
the method further comprises heating the outer neck surface of the neck portion for 15 to 100 seconds to a temperature of between 140° C. and 250° C.

12. The method according to claim 11, wherein the material of the container comprises at least 80 Wt % polyethylene terephthalate material.

* * * * *